June 6, 1961
H. A. TOULMIN, JR
2,986,842
METHOD AND MECHANISM FOR REGULATING AND INCREASING
PHOTOSYNTHESIS OF GROWING PLANTS; ALSO
FOR IRRIGATING THE PLANTS
Filed July 7, 1959
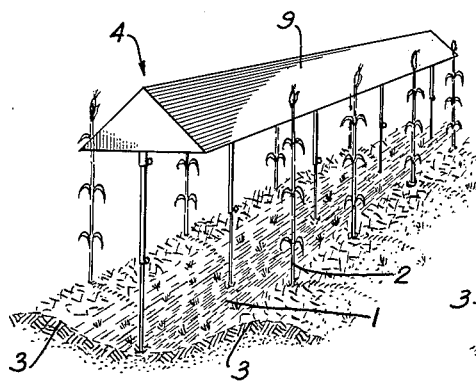
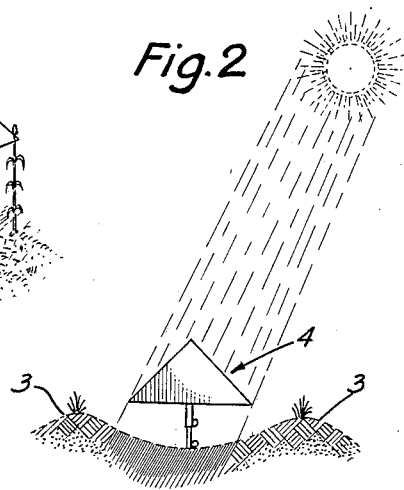
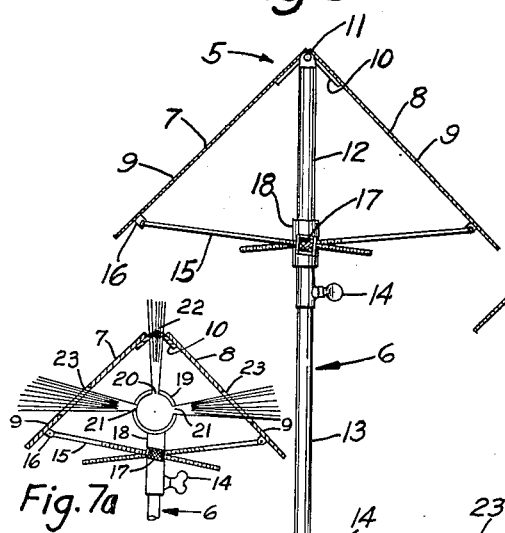
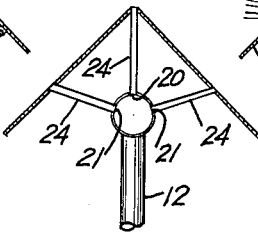
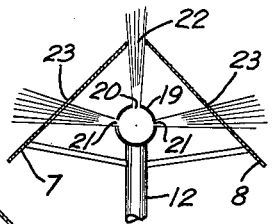
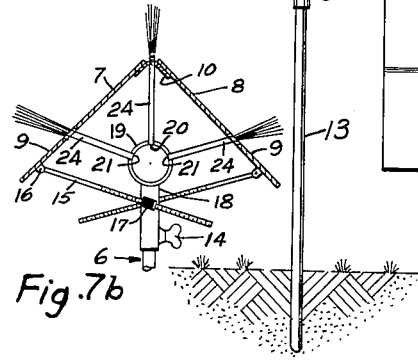
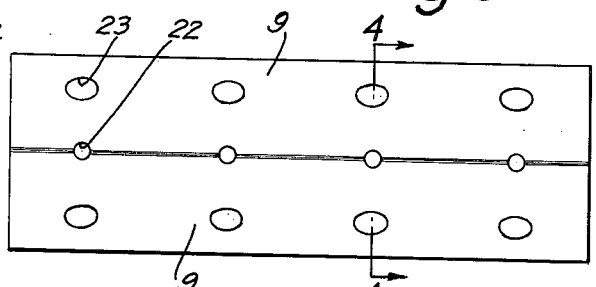
INVENTOR
HARRY A. TOULMIN, JR.
BY Toulmin & Toulmin
ATTORNEYS

United States Patent Office 2,986,842
Patented June 6, 1961

2,986,842
METHOD AND MECHANISM FOR REGULATING AND INCREASING PHOTOSYNTHESIS OF GROWING PLANTS; ALSO FOR IRRIGATING THE PLANTS
Harry A. Toulmin, Jr., Dayton, Ohio, assignor to Basic Research Corporation, Dayton, Ohio
Filed July 7, 1959, Ser. No. 825,430
9 Claims. (Cl. 47—58)

The present invention relates to the growing of plants, more particularly, to increasing the solar radiation received by the plants so as to regulate and increase the photosynthesis of these growing plants. This invention relates also to irrigating the plants.

It is well known that in the growing of any plants, solar radiation must be received by the plants in order for the growing process to be carried out. The growing process comprises in part the photosynthesis occurring within the plants wherein carbohydrates are formed. Radiation in the form of light, or solar radiation, is necessary for the process of photosynthesis.

The advantages of growing plants in areas which continuously receive solar radiation are known. In these cases, however, the plants receive only that solar radiation which directly falls upon the plants. The remaining solar radiation falls upon the surrounding soil and serves to promote the growth of weeds, which is not desirable. In order to promote the growth of plants, more effective use should be made of the solar radiation which is available.

The present invention provides a method and apparatus for the most effective use of available solar radiation. This invention essentially comprises reflecting of the solar radiation which by-passes the plants against the growing plants so that the plants have the benefit of the solar radiation which is directly received and of this reflected solar radiation. In addition, the solar radiation which falls upon the soil between the growing plants is reflected against the plants so as to deprive unwanted plant life, such as weeds growing between the plants, from needed solar radiation.

It is therefore the principal object of this invention to provide a novel and improved method and apparatus for the growing of plants.

It is another object of this invention to provide a method and apparatus for utilizing both direct and reflected solar radiation in the growing of plants.

It is a further object of this invention to provide an apparatus for increasing the growth of plants by concurrently providing for reflecting solar radiation onto the plants and for irrigating the plants.

Other objects and advantages of this invention will become apparent upon reference to the accompanying description when taken in conjunction with the following drawings, wherein:

FIGURE 1 is an over-all perspective view of a portion of a field in which plants are grown in rows utilizing the present invention;

FIGURE 2 is a side elevational view of the subject invention showing the invention in position when the plants are beginning to sprout from the soil;

FIGURE 3 is a side elevation view showing in detail the structure of the apparatus of this invention;

FIGURE 4 is a sectional view taken along the line 4—4 of FIGURE 6 and shows a modification of the apparatus illustrated in FIGURE 3 wherein structure is provided for irrigating the growing plants;

FIGURE 5 is a sectional view similar to that of FIGURE 4 and shows another modification of the structure as illustrated in FIGURE 3 which also provides for the irrigation of plants utilizing this invention;

FIGURE 6 is a top plan view of the modification shown in FIGURE 4;

FIGURE 7a illustrates a modification of the structure shown in FIGURE 4; and

FIGURE 7b illustrates a modification of the structure shown in FIGURE 5.

Returning now to the drawings, wherein like reference symbols indicate the same parts throughout the various views, there is shown in FIGURE 1 a field indicated at 1 wherein plants 2, such as corn, are grown in rows 3. The apparatus of this invention, indicated at 4, is shown in an operative position between a pair of rows 3.

The apparatus of this invention essentially comprises a reflecting structure 5 and a supporting structure 6.

The reflecting structure comprises panels 7 and 8, each of which has a reflecting surface 9. The surface 9 may be formed from aluminum foil so as to be removed from the panels. Alternately, the panels themselves may be formed from aluminum with the outer surfaces thereof being highly polished.

Panels 7 and 8 are pivotally connected along their upper edges by a hinge 10 which is supported between a pair of vertical brackets 11 extending upwardly from a vertical upright 12 which comprises the supporting structure 6.

The vertical upright 12 comprises a plurality of telescopically arranged tubes 13, each of which has a set screw or the like 14 for locking the tubular members in position with respect to each other.

The panels 7 and 8 are also connected to the vertical upright by means of adjusting arms 15, each of which has one end pivotally connected to a boss or projection 16 on the inner surface of the panel. The other end of the arm 15 is threadedly received in an adjusting nut 17 which is rotatably mounted on a bracket 18 secured to the vertical upright. Each of the adjusting arms is similarly connected so that the panels 7 and 8 may be individually adjusted.

The lower end of the vertical upright is imbedded in the soil between the rows of plants.

With the above-described structure, the reflecting panels may be adjusted so as to reflect the maximum amount of solar radiation onto those portions of the plant where needed. Thus, when the plants are first beginning to sprout from the soil, as illustrated in FIGURE 2, the uprights are contracted to such a height that radiation is reflected from the panels onto these sprouts. As the plants grow and the heights thereof increase, the uprights are gradually lengthened so that the reflecting panels will reflect solar radiation onto the uppermost parts of the plants.

As can be seen in FIGURE 2, the reflecting structure shades the soil between the rows of plants. This prevents solar radiation from acting upon any undesirable plant life, such as weeds and the like, which may be found between the rows of plants. Thus, not only does this apparatus increase the growth of plants but, because of its shading, reduces the growth of undesirable plant life.

A modification of this apparatus is illustrated in FIGURE 4. In this modification, means for irrigating the plants are mounted between the reflecting panels. This means comprises a tubular member 19 which extends along the length of the panel structure. The tubular member is mounted upon the upper end of the vertical upright, which is hollow so as to permit liquid to be flowed up through the upright into the tubular member.

The tubular member 19 is provided with top openings 20 and side openings 21. The panel structure is provided with corresponding openings in the form of openings 22 at the apex of the panel structure and openings 23 in the surfaces of the panel members. The panel openings are somewhat larger than the tubular member openings so that the liquid discharged from the tubular member openings may pass through the panel member openings onto the growing plants.

This tubular member structure may be used for containing water to be used in irrigating the plants, for a liquid fertilizer to improve the quality of the plants, or for an insecticide to protect the plants from the destructive effects of various insects.

The remainder of the structure of this modification is similar to that described with respect to the structure illustrated in FIGURE 3.

In FIGURE 5 there is illustrated a further modification of this invention wherein the openings 20 and 21 in the tubular member communicate with the outer faces of the reflecting panels through connecting tubes 24. The tubes 24 are considerably smaller in diameter than the tubular member 19. Also, in this modification, the openings in the reflecting panels are considerably smaller than the modification in FIGURE 4. Thus, the modification in FIGURE 5 does not appreciably decrease the reflecting surface of the panels.

The modification shown in FIGURE 7a differs from that shown in FIGURE 4 in that the reflecting panels 7 and 8 are hinged together similarly as illustrated in the structure of FIGURE 3, the top or apex being open to permit liquid to be discharged therethrough as shown.

The structure illustrated in FIGURE 7b is similar to that shown in FIGURE 5 except that the reflecting panels 7 and 8 are hinged together like the construction shown in FIGURE 3. Suitable connection may be made to the tubular member 19 whereby water or liquid fertilizer may be forced through tubes 24 and discharged on the plants.

Thus, with the modifications of FIGURES 4 and 5, the plants may be irrigated concurrently with the reflecting of solar radiation thereon. The establishing of these circumstances favorable to the growth of plants by the use of this structure will greatly increase the yield of plants from fields so equipped.

Another result achieved by this invention is the retention of moisture in the soil. Since the panel structure will shade a portion of the soil, the moisture in this shaded portion will not be susceptible to evaporation by the sun. Accordingly, moisture will be available in the soil adjacent the growing plants considerably longer than would be the case if the reflecting structure did not shade portions of the soil.

While the reflecting panels may be readily adjusted by hand, if desired, automatic apparatus may be provided so as to continuously adjust the position of the panels according to the position of the sun. It can be appreciated that for best results, solar radiation should be reflected from the panels against the growing plants at all times.

The above-described apparatus, which is placed between rows of plants, has the advantage of reflecting the solar radiation to the greatest number of plants. However, other forms of this apparatus may be used depending upon the particular pattern in which the plants have been planted.

This invention can not only be used for crops such as corn and the like, but may be used for flowers and other specialized forms of plants.

Thus it can be seen that the present invention provides a simple yet effective structure and method for increasing the growing of plants. This invention is particularly advantageous to those areas where the growing season is rather short, since this invention will enable the grower to make effective use of the available solar radiation.

It will be understood that this invention is susceptible to modification in order to adapt it to different usages and conditions, and, accordingly, it is desired to comprehend such modifications within this invention as may fall within the scope of the appended claims.

What I claim is:

1. An apparatus for increasing the photosynthesis of growing plants comprising a pair of reflecting panels fastened together along corresponding edges thereof to form an inverted-V structure, means to adjust the angle between said reflecting panels, a supporting structure for said inverted-V structure, and means on said supporting structure for varying the height thereof to adjust the vertical position of said reflecting panel structure, and a conduit for containing liquid arranged to receive reflected rays from said pair of reflecting panels and which liquid is adapted for application to said plant.

2. An apparatus for increasing the photosynthesis of growing plants comprising a pair of reflecting panels pivotally connected together along corresponding edges thereof to form an inverted-V structure, a tubular member mounted between said reflecting panels for containing a liquid and extending along the length thereof, there being openings in said tubular member along the length thereof, there being additional openings in said reflecting panels in registration with said openings in the tubular member whereby liquid discharged from said tubular member openings will pass through said panel openings onto said growing plants.

3. An apparatus for increasing the photosynthesis of growing plants comprising a pair of reflecting panels pivotally connected together along corresponding edges thereof to form an inverted-V structure, a tubular member mounted between said reflecting panels along the length thereof for containing a liquid, there being openings in said tubular member on the top and sides thereof, there being openings in said panel structure located in the apexes thereof to cooperate with the openings in the top of the tubular member and in the faces of said panels to cooperate with the openings in the sides of said tubular member, and a supporting structure for said reflecting panel structure.

4. An apparatus for increasing the photosynthesis of growing plants comprising a pair of reflecting panels pivotally connected together along corresponding edges thereof to form an inverted-V structure, a tubular member mounted between said reflecting panels for containing a liquid and extending throughout the length of said panel structure, there being openings in said tubular member spaced along the length thereof, a connecting tube of a smaller diameter than said tubular member connecting each of said tubular member openings with the outer surface of said reflecting panels to enable the liquid contained in said tubular member to be discharged from the outer surface of said reflecting panels, and a supporting structure for said reflecting panels.

5. A vertically adjustable apparatus for increasing the photosynthesis of growing plants comprising a pair of panels pivotally connected together along corresponding edges thereof to form an inverted-V structure, a reflecting surface on the outer faces of said panels, a conduit for containing liquid arranged to receive reflected rays from said surface and which liquid is adapted to be applied onto said plants, and a supporting structure for said panel structure.

6. An apparatus for increasing the photosynthesis of growing plants comprising a pair of reflecting panels fastened together along corresponding edges thereof to form an inverted-V structure, a supporting structure for said inverted-V structure, and means carried by said inverted-V panel structure comprising a conduit containing liquid which is adapted to be heated by reflected rays from said reflecting panels, said liquid being adapted for irrigating the growing plants.

7. In a method of growing plants, the steps comprising exposing the plants to direct solar radiation, reflecting solar radiation against the plants to increase the total solar radiation received by the plants, and irrigating the growing plants concurrently with reflecting solar radiation thereon by the application thereto of water heated by said solar radiation.

8. In a method of growing plants, the steps comprising exposing the plants to direct solar radiation, reflecting solar radiation against the plants to increase the total solar radiation received by the plants, and irrigating the growing plants concurrently with reflecting solar radiation thereon, said irrigating comprising the application of liquid preheated by said reflecting solar radiation.

9. An apparatus for increasing the photosynthesis of growing plants comprising an adjustable reflecting surface positionable to reflect the maximum amount of solar radiation into said plants and a supporting structure for said reflecting surface, said supporting structure comprising a plurality of vertical uprights, each of said vertical uprights comprising a plurality of telescopically arranged tubular members adapted to be filled with liquid for application to said plants, and means on said uprights for locking said telescopically arranged tubular members in position with respect to each other.

References Cited in the file of this patent

UNITED STATES PATENTS

| | | |
|---|---|---|
| 175,084 | Harrington | Mar. 21, 1876 |
| 188,570 | Beidler | Mar. 20, 1877 |
| 1,144,663 | Merriman | June 29, 1915 |
| 1,632,254 | Vinogradov | June 14, 1927 |
| 2,639,551 | McKee | May 26, 1953 |
| 2,777,253 | Bensin | Jan. 15, 1957 |
| 2,940,219 | Schiller | June 14, 1960 |

FOREIGN PATENTS

| | | |
|---|---|---|
| 928,023 | France | May 19, 1947 |
| 274,790 | Switzerland | July 16, 1951 |